No. 855,663. PATENTED JUNE 4, 1907.
P. POLITOWSKI.
ROTARY METER.
APPLICATION FILED OCT. 29, 1906.
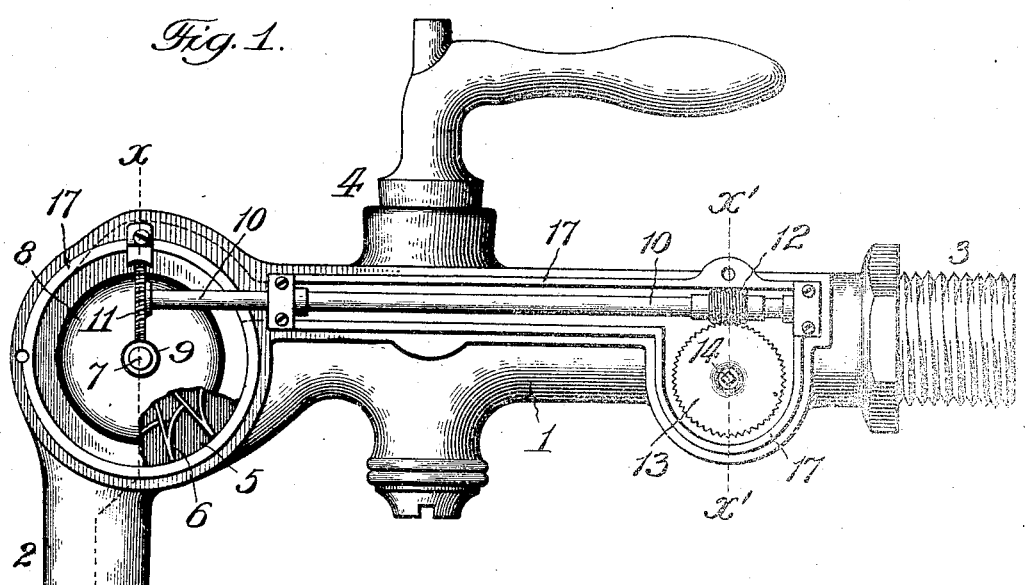
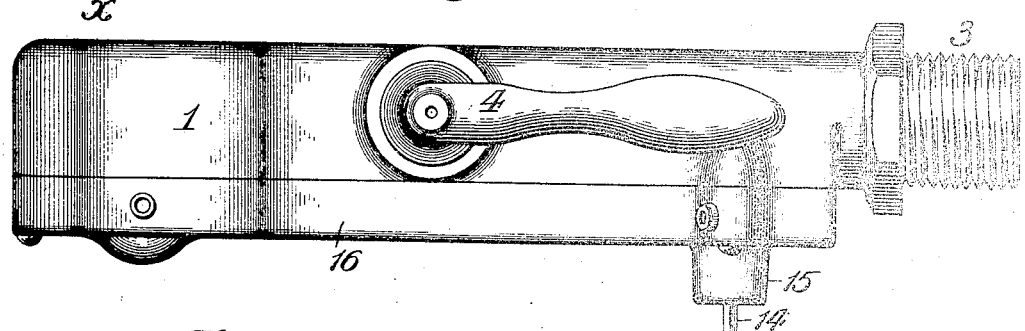
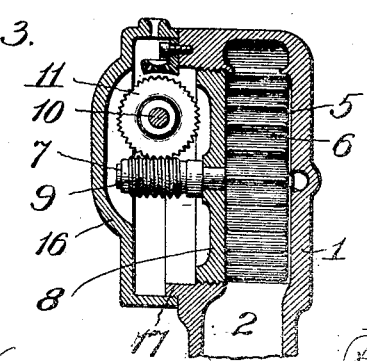 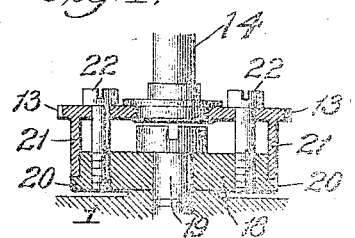
Attest:
John Enders
M. H. Holmes
Inventor:
Paul Politowski,
by Robert Burns, Attorney

UNITED STATES PATENT OFFICE.

PAUL POLITOWSKI, OF CHICAGO, ILLINOIS.

ROTARY METER.

No. 855,663.  Specification of Letters Patent.  Patented June 4, 1907.

Application filed October 29, 1906. Serial No. 341,006.

*To all whom it may concern:*

Be it known that I, PAUL POLITOWSKI, a citizen of the United States of America, and a resident of Chicago, in the county of Cook and State of Illinois, have invented certain new and useful Improvements in Rotary Meters, of which the following is a specification.

This invention relates to rotary meters for measuring the flow of fluids, and has for its object to provide a simple and efficient structural arrangement and combination of parts in faucet or cock, whereby the flow of fluid from the same is measured and registered in a ready and accurate manner, all as will hereinafter more fully appear.

In the accompanying drawings:—Figure 1, is a side elevation of the present combined faucet and rotary meter, the side cap or cover being removed to illustrate the interior mechanism, and with a portion of the head in which the meter wheel is journaled, broken away to show a portion of said wheel. Fig. 2, is a plan view. Fig. 3, is a detail transverse section on line $x$—$x$, Fig. 1. Fig. 4, is an enlarged detail section on line $x'$—$x'$ Fig. 1, of the rear worm wheel and its journal support on the body of the faucet.

Similar numerals of reference indicate like parts in the several views.

Referring to the drawings, 1 represents the faucet body having the usual downturned outlet neck 2, at its forward end; the screw threaded attaching neck 3, at its rear end, and the intermediate handled plug valve 4, by which the flow of fluid through the faucet is controlled.

In the present invention the body of the faucet between the outlet neck 2 and valve 4, is formed with an enlarged circular cavity or chamber 5, into which the fluid passing through the valve 4 discharges, preferably in a tangential manner, so as to impinge against the bladed perimeter of the rotary meter wheel hereinafter described.

6, is the rotary meter wheel formed with a series of radial blades of any usual form and arrangement; such wheel is arranged in the cavity or chamber 5, and snugly fills the same, and capable of free rotation therein.

7, is the carrying shaft of the meter wheel 6, journaled at one end in a journal recess in a fixed end head of the chamber 5, while at its other end, said shaft is journaled in a bearing orifice in a removable head 8, which forms the closure for the other and open end of the aforesaid chamber or cavity.

9, is an endless screw or worm secured to the last mentioned end of the shaft 7, and at the side of the head 8 opposite to that at which the rotary meter wheel 6 is arranged and as illustrated in Fig. 3.

10, is a motion transmitting shaft arranged at the side of the faucet body 1, in suitable bearings, as shown, and provided at its forward end with a worm wheel 11, which gears with and receives motion from the aforesaid endless screw or worm 9; near its rear end said shaft is provided with an endless screw or worm 12 adapted for operative engagement with a secondary worm wheel, now to be described.

13, is a worm wheel journaled on the side of the faucet body 1, and near the rear end of the same by means hereinafter more particularly described; such worm wheel gears with and receives motion from the endless screw or worm 12, and is provided with a non-circular stem 14, adapted for engagement with the primary gear or shaft of a cyclometer or revolution counter of any ordinary and suitable construction, and which may be connected to a neck 15 of the cap piece, hereinafter described.

With the described arrangement of parts, the means for actuating the revolution counter, as well as the counter itself, are located near the rear of the faucet body, so as to be out of the way and free from accident in the continued and frequent manipulations of the faucet.

16, is a cap or casing fitting the side of the faucet body 1, to inclose the motion transmitting mechanism above described, to protect the same from dust, and from unauthorized manipulation, and with a view to afford a close fit, the faucet body will be provided with lateral rims 17, outside of which the cap or casing fits, as illustrated more particularly in Figs. 1 and 3.

18, is a carrying disk for the worm wheel 13 above described; such disk turns on a headed screw 19, screwed into the faucet body, and at its lower end said disk is provided with a marginal lip or flange 20, as shown in Fig. 4.

21, is an annular rim on one side of the worm wheel 13, and adapted to encircle the periphery of the disk 18, and abut against the lip or flange 20 thereof to provide a cavity between the parts for the head of the screw 19.

22, are screws by which the worm wheel 13 and disk 18 are attached together.

Having thus fully described my said invention what I claim as new and desire to secure by Letters Patent, is:—

1. The combination of a faucet provided with an attaching neck and an outlet neck at its opposite ends, a valve between said necks, an enlarged cavity between the valve and outlet neck and a longitudinal chamber at one side and connected at its forward end with said enlarged cavity, a rotary meter wheel arranged in said enlarged cavity and having at one side an endless screw, a removable head or partition arranged in said cavity between the meter wheel and endless screw, a revoluble stem journaled at the rear end of the longitudinal chamber aforesaid, intermediate gearing between said revoluble stem and the meter wheel and arranged in the longitudinal chamber aforesaid, and a cap piece closing said longitudinal chamber and the open end of the enlarged cavity aforesaid, substantially as set forth.

2. The combination of a faucet provided with an attaching neck and an outlet neck at its opposite ends, a valve between said necks, an enlarged cavity between the valve and outlet neck and a longitudinal chamber at one side and connected at its forward end with said enlarged cavity, a rotary meter wheel arranged in said enlarged cavity and having at one side an endless screw, a removable head or partition arranged in said cavity between the meter wheel and endless screw, a revoluble stem journaled at the rear end of the longitudinal chamber aforesaid, intermediate gearing between said revoluble stem and the meter wheel, the same comprising a longitudinal shaft arranged in the longitudinal chamber aforesaid and provided at its forward end with a worm wheel engaging the endless screw of the meter wheel and at its rear end with an endless screw engaging a worm wheel carried by the revoluble stem aforesaid, and a cap piece closing said longitudinal chamber and the open end of the enlarged cavity aforesaid, substantially as set forth.

3. In a transmission mechanism for faucet meters, the combination of a worm wheel having an annular rim on one side, a carrying disk having a marginal flange, a headed attaching screw passing through said carrying disk and means for connecting the worm wheel and carrying disk together.

4. In a transmission mechanism for faucet meters, the combination of a worm wheel having an annular rim on one side, a carrying disk having a marginal flange, a headed attaching screw passing through said carrying disk, and means for connecting the worm wheel and carrying disk together, the same comprising screw bolts passing through the respective parts.

Signed at Chicago, Illinois, this 20th day of October 1906.

PAUL POLITOWSKI

Witnesses:
YOE. KUROWSKI,
ROBERT BURNS.